United States Patent
Winger et al.

(10) Patent No.: US 8,204,122 B2
(45) Date of Patent: Jun. 19, 2012

(54) COMPRESSED NON-REFERENCE PICTURE RECONSTRUCTION FROM POST-PROCESSED REFERENCE PICTURES

(75) Inventors: Lowell L. Winger, Waterloo (CA); Ossama E. A. El Badawy, Waterloo (CA); Cheng-Yu Pai, Brossard (CA)

(73) Assignee: LSI Corporation, Milpitas, CA (US)

( * ) Notice: Subject to any disclaimer, the term of this patent is extended or adjusted under 35 U.S.C. 154(b) by 1365 days.

(21) Appl. No.: 11/781,440

(22) Filed: Jul. 23, 2007

(65) Prior Publication Data

US 2009/0028244 A1 Jan. 29, 2009

(51) Int. Cl.
*H04N 7/26* (2006.01)

(52) U.S. Cl. ............... 375/240.16; 375/240.02; 382/236

(58) Field of Classification Search ............. 375/240.16, 375/240.02
See application file for complete search history.

(56) References Cited

U.S. PATENT DOCUMENTS 6,233,277 B1 * 5/2001 Ozcelik et al. ........... 375/240.02

OTHER PUBLICATIONS http://www.eetimes.com/design/embedded/4013028/Video-compression-artifacts-and-MPEG-noise-reduction http://whatis.techtarget.com/definition/0,,sid9_gci212365,00.html http://searchtelecom.techtarget.com/definition/comfort-noise-generator-CNG.*

* cited by examiner

*Primary Examiner* — Nathan Flynn
*Assistant Examiner* — Phuoc Tran
(74) *Attorney, Agent, or Firm* — Christopher P. Maiorana, PC

(57) ABSTRACT

A method of compressed picture reconstruction using a plurality of post-processed reference pictures. The method generally includes the steps of (A) generating a first of a plurality of reconstructed pictures by decoding a first of a plurality of compressed pictures using at least one of a plurality of non-post-processed reference pictures buffered in a reference memory, wherein the compressed pictures are received in an input bitstream, (B) generating a first of a plurality of processed pictures by artifact processing the first reconstructed picture to remove artifacts, (C) buffering in the reference memory both (i) the first reconstructed picture as one of the non-post-processed reference pictures and (ii) the first processed picture as one of the post-processed reference pictures and (D) generating a second of the reconstructed pictures by decoding a second of the compressed pictures using at least one of the post-processed reference pictures buffered in the reference memory.

20 Claims, 4 Drawing Sheets

COMPRESSED NON-REFERENCE PICTURE RECONSTRUCTION FROM POST-PROCESSED REFERENCE PICTURES

FIELD OF THE INVENTION

The present invention relates to digital video decoding generally and, more particularly, to compressed non-reference picture reconstruction from post-processed reference pictures.

BACKGROUND OF THE INVENTION

Digital video compressed with block-based compression techniques exhibits blocking artifacts that are visually disturbing. The artifacts are particularly noticeable where the compression is done without normative deblocking filters, such as with the MPEG-2, MPEG-4 Part 2, Divx and other codecs. Newer video codecs, such as H.264 and VC-1, address the blocking artifacts by introducing in-loop deblocking filters. Post-loop (i.e., post-processing, out-of-the-loop) deblocking filters are also used in some conventional applications as a separate post-process after the decoder.

The in-loop deblocking of all frames during decoding may only be applied to reduce blockiness for codecs in which the in-loop deblocking is normatively applied during encoding. Otherwise, decoding non-deblocked video with an in-loop deblocking filter introduces an unacceptable amount of drift in the decoded video. For example, if all MPEG-2 decoded pictures were to be reconstructed using deblocked reference pictures, then drift error would accumulate until the decoder receives a next refresh picture (i.e., an I-picture). In many cases, the drift error can be very large, and therefore degrade the video quality to an unacceptable extent.

Conventional post-processing deblocking has the disadvantage that the blockiest frames (which are typically B-frames in MPEG-2) are reconstructed from reference frames that are also blocky. As a result, a great deal of blockiness can be present in the interior of such pictures as introduced to the interior of the blocks through motion compensated prediction from the non-deblocked reference frames. The interior blockiness further degrades visual quality. In all conventional techniques for both in-loop deblocked and post-processed/deblocked video decoding, only a single version of each reference picture is generated and maintained for the decoding of future pictures.

SUMMARY OF THE INVENTION

The present invention concerns a method of compressed picture reconstruction using a plurality of post-processed reference pictures. The method generally comprises the steps of (A) generating a first of a plurality of reconstructed pictures by decoding a first of a plurality of compressed pictures using at least one of a plurality of non-post-processed reference pictures buffered in a reference memory, wherein the compressed pictures are received in an input bitstream, (B) generating a first of a plurality of processed pictures by artifact processing the first reconstructed picture to remove artifacts, (C) buffering in the reference memory both (i) the first reconstructed picture as one of the non-post-processed reference pictures and (ii) the first processed picture as one of the post-processed reference pictures and (D) generating a second of the reconstructed pictures by decoding a second of the compressed pictures using at least one of the post-processed reference pictures buffered in the reference memory.

The objects, features and advantages of the present invention include providing compressed non-reference picture reconstruction from post-processed reference pictures that may (i) reduce blocky artifacts, (ii) avoid drift accumulation between successive reference pictures and/or (iii) provide high visual quality of post-processed pictures.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention uses a current picture type to determine whether non-post-processed reference pictures or post-processed reference pictures are used during decoding operations. As such, two copies of each reference picture are generated and buffered in a reference memory to support motion compensation. The increased number of reference pictures is generally met in modern multicodec systems since the memory resource criteria (e.g., memory capacity, cycles, etc.) of alternative codecs in the system (e.g., H.264) are so much higher than that of existing blocky codecs (e.g., MPEG-2, MPEG-4 Part 2, Divx, etc.) that accommodating more reference pictures (e.g., reference fields and/or reference frames) typically does not incur an increase in system cost.

When decoding video, a receiver implementing the present invention generally considers the picture type being decoded. The picture types may include intra-pictures (I-pictures), predicted pictures (P-pictures) and bidirectional pictures (B-pictures). Non-reference type pictures (e.g., B-pictures) may be reconstructed using the post-processed (e.g., deblocked) reference pictures (e.g., P-pictures and/or I-picture). Some reference type pictures (e.g., P-pictures) may be reconstructed from the non-post-processed (e.g., non-deblocked) reference pictures (e.g., other P-pictures and/or I-pictures). Reconstruction of the I-pictures does not rely on reference pictures for motion compensation. To improve overall picture quality, the receiver may also post-process (e.g., deblock) the reconstructed reference type pictures (e.g., P-picture and I-pictures) before transmission to a display monitor.

The use of both post-processed reference pictures and non-post-processed reference pictures in the decoding operations generally means storing both versions of each reference picture in the reference memory, or generating both versions on the fly to support decoding of future pictures. A control mechanism may be used to determine which type of reference picture is used for motion-compensated decoding of each compressed picture. Limiting the use of post-processed reference pictures to non-reference type pictures generally prevents drift from accumulating between successive reference pictures. The absence of drift may result in a good visual quality in the post-processed pictures.

Figure 1:
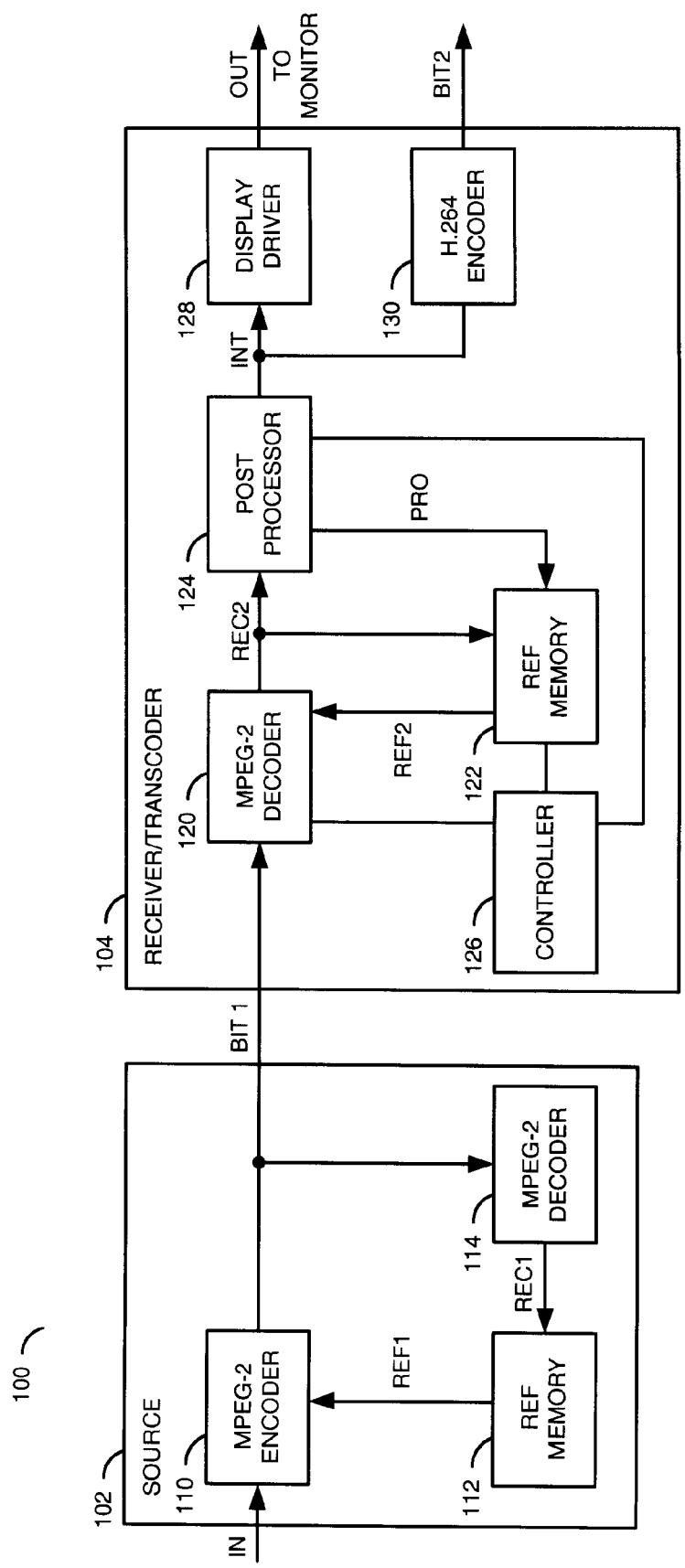
FIG. 1 is a block diagram of system in accordance with a preferred embodiment of the present invention.

Referring to FIG. 1, a block diagram of system 100 is shown in accordance with a preferred embodiment of the present invention. The system (or apparatus) 100 may implement a digital video system that encodes without an in-loop deblocking filter. The system 100 generally comprises a circuit (or module) 102 and a circuit (or module) 104. An input signal (e.g., IN) may be received by the circuit 102. A first bitstream (e.g., BIT1) may be generated by the circuit 102 and presented to the circuit 104. In some embodiments, the circuit 104 may generate an output signal (e.g., OUT) suitable to drive a display monitor. In some embodiments, the circuit 104 may generate a second bitstream (e.g., BIT2).

The circuit 102 generally implements a source of the signal BIT1. The circuit 102 may be operational to encode/compress the video information received via the signal IN to create the signal BIT1. During the encoding operations, reference pictures generated for motion compensation purposes may be created absent any in-loop processing or post-loop processing. The signal IN may be an analog video signal and/or a digital video signal. The signal IN may comprise a sequence of progressive-format frames and/or interlace-format fields. The signal BIT1 may be compliant with MPEG-2, MPEG-4 Part 2, Divx, H.262, H.263 or other similar codecs.

The circuit 104 may be implemented as a receiver and/or a transcoder. As a receiver, the circuit 104 may be operational to decode the compressed pictures received in the signal BIT1 to create the signal OUT. As a transcoder, the circuit 104 may be operational to decode the compressed pictures received in the signal BIT1 and then encode the pictures into the signal BIT2. The signal BIT2 may be compliant with the MPEG-2, MPEG-4 Part 2, Divx, H.262, H.263, H.264/MPEG-4 Advanced Video Coding (AVC), VC-1 or other codecs.

The circuit 102 generally comprises a module (or block) 110, a module (or block) 112 and a module (or block) 114. The module 110 may receive the signal IN. The signal BIT1 may be generated by the module 110. A signal (e.g., REF1) conveying reference pictures may be generated by the module 112 and presented to the module 110. The module 114 may receive the signal BIT1. The module 114 may generate a signal (e.g., REC1) conveying reconstructed pictures to the module 112.

The module 110 generally implements an encoder module. By way of example, the module 110 may be operational to encode the video received in the signal IN per the MPEG-2 codec to generate the signal BIT1. Other codecs may be implemented to meet the criteria of a particular application.

The module 112 generally implements a reference memory. The module 112 may be operational to buffer reference pictures used by the module 110 for motion-compensated encoding. The reference pictures may be carried from the module 112 to the module 110 in the signal REF1.

The module 114 generally implements a decoder module. The module 114 may be operational to decode the signal BIT1 to reconstruct the reference pictures. The new reference pictures may be passed to the module 112 by way of the signal REC1.

The circuit 104 generally comprises a module (or block) 120, a module (or block) 122, a module (or block) 124, a module (or block) 126, an optional module (or block) 128 and an optional module (or block) 130. The module 120 may receive the signal BIT1. A signal (e.g., REC2) may convey reconstructed pictures from the module 120 to the module 122 and from the module 120 to the module 124. The module 122 may present a signal (e.g., REF2) carrying reference pictures to the module 120. A signal (e.g., PRO) carrying post-processed pictures may be presented from the module 124 to the module 122. The module 124 may also present a signal (e.g., INT) carrying intermediate post-processed pictures to one or both of the modules 128 and/or 130. The module 128 may generate and present the signal OUT. The module 130 may generate and present the signal BIT2. The module 126 may be in communication with the modules 120, 122 and 124 to send and receive information and commands used in both (i) controlling the generation of and (ii) the use of the non-post-processed reference pictures and the post-processed references pictures.

The module 120 generally implements a decoder module. The module 120 may be operational to decode (reconstruct) the compressed pictures received in the signal BIT1 in compliance with the codec used by the module 110 to encode the compressed pictures. The reconstructed pictures may be presented to the module 122 and to the module 124 in the signal REC2.

The module 122 generally implements a reference memory. The module 122 may be operational to buffer the non-post-processed reference pictures and the post-processed reference pictures. The non-post-processed reference pictures may be received from the module 120 via the signal REC2. The post-processed reference pictures may be received from the module 124 via the signal PRO. Each of the reference pictures (e.g., non-post-processed and post-processed) may be presented to the module 120 in the signal REF2 to support motion-compensated decoding. Buffering and distribution of the reference pictures may be performed according to commands issued by the module 126.

The module 124 generally implements a post-processor module. The module 124 may be operational to post-process the reconstructed pictures (e.g., I-pictures, P-pictures and B-pictures) received via the signal REC2. All of the post-processed pictures may be presented as intermediate pictures in the signal INT. Some post-processed pictures (e.g., some to all of the P-pictures) may be sent to the module 122 in the signal PRO as new post-processed reference pictures. The post-processing generally includes, but is not limited to, full deblock filtering, partial deblock filtering (e.g., filtering only at the block grid boundaries), mosquito noise reduction, interlaced format to progressive format conversions (e.g., deinterlacing) and/or comfort noise addition.

The module 126 generally implements a controller module. The module 126 may be operational to determine which reconstructed pictures are stored in the module 122 as non-post-processed reference pictures and which reconstructed pictures are stored as post-processed-reference pictures. Generally, (i) all reconstructed I-pictures and (ii) some to all of the P-pictures may be stored as non-post-processed reference pictures. Some to all of the P-pictures may be stored in the module 122 as post-processed-reference pictures. Most, if not all, of the B-pictures may be decoded using the post-processed reference pictures. Furthermore, most, if not all, of the P-pictures may be decoded using the non-post-processed reference pictures. In some embodiments, a few of the P-pictures may be decoded using the post-processed reference pictures. In some embodiments, a few of the B-pictures may be decoded using the non-post-processed reference pictures.

The module 128 generally implements a display driver module. The module 128 may be operational to generate the signal OUT based on the signal INT. The signal OUT may be one or more analog video signals and/or one or more digital video signals. The signal OUT generally comprises a sequence of progressive-format frames and/or interlace-format fields. The signal OUT may include synchronization signals suitable for synchronizing a display with the video information. The signal OUT may be generated in analog form as, but is not limited to, an RGB (Red, Green, Blue)

signal, an EIA-770 (e.g., YCrCb) signal, an S-video signal and/or a Composite Video Baseband Signal (CVBS). In digital form, the signal OUT may be generated as, but is not limited to, a High Definition Multimedia Interface (HDMI) signal, a Digital Video Interface (DVI) signal and/or a BT.656 signal. The signal OUT may be formatted as a standard definition signal or a high definition signal. In applications where the circuit 104 implements a pure transcoder, the module 128 may be eliminated.

The module 130 generally implements an encoder module. The module 130 may be operational to encode the intermediate pictures in the signal INT to create the signal BIT2. The signal BIT2 may be compliant with a VC-1, MPEG, Divx and/or H.26x codecs. The MPEG/H.26x codecs generally include H.261, H.264, H.263, MPEG-1, MPEG-2, MPEG-4 and H.264/AVC. The MPEG codecs may be defined by the Moving Pictures Expert Group, International Organization for Standards, Geneva, Switzerland. The H.26x codecs may be defined by the International Telecommunication Union-Telecommunication Standardization Sector, Geneva, Switzerland. The VC-1 codec may be defined by the document Society of Motion Picture and Television Engineer (SMPTE) 421M-2006, by the SMPTE, White Plains, N.Y. The Divx codec may be defined by DivX, Incorporated, San Diego, Calif. Where the circuit 104 implements a pure player, the module 130 may be eliminated.

Figure 2:
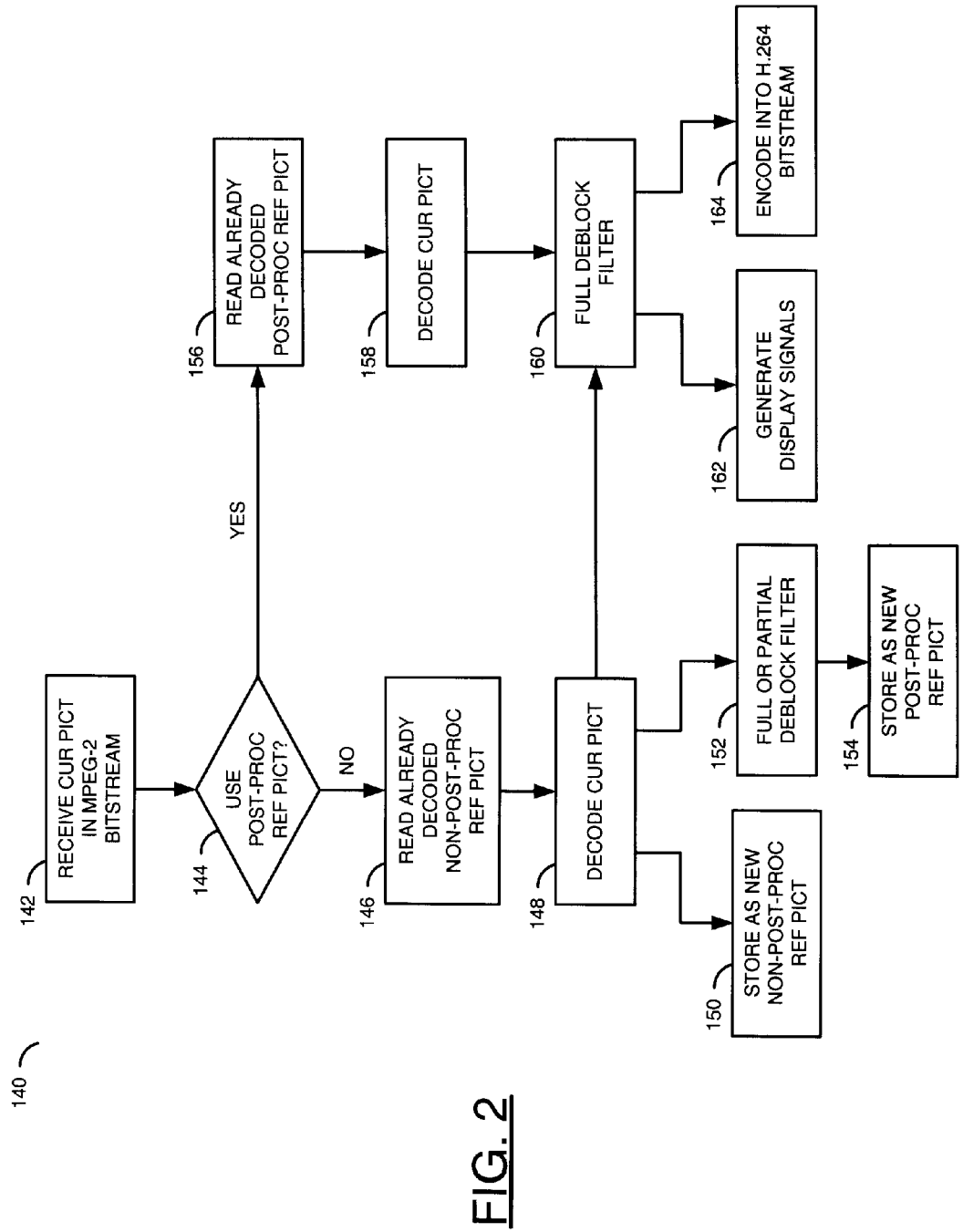
FIG. 2 is a flow diagram of an example method of compressed non-reference picture reconstruction from post-processed pictures.

Referring to FIG. 2, a flow diagram of an example method 140 of compressed non-reference picture reconstruction from post-processed pictures is shown. The method (or process) 140 may be implemented by the circuit 104. The method 140 generally comprises a step (or block) 142, a step (or block) 144, a step (or block) 146, a step (or block) 148, a step (or block) 150, a step (or block) 152, a step (or block) 154, a step (or block) 156, a step (or block) 158, a step (or block) 160, a step (or block) 162 and a step (or block) 164.

In the step 142, compressed pictures in the signal BIT1 may be received by the module 120. The module 126 may examine the picture type of each successive picture in the step 144 to distinguish (i) pictures that may use a post-processed reference during decoding and (ii) pictures that should use a non-post-processed reference. For the pictures that should use a non-post-processed reference picture (e.g., the NO branch of step 144), a corresponding non-post-processed reference picture (previously decoded) may be read from the module 122 to the module 120 via the signal REF2 in the step 146. The module 120 may then motion-compensated decode the current compressed picture using the non-post-processed reference picture in the step 148.

The reconstructed picture may be presented from the module 120 in the signal REC2 to both the module 122 and the module 124. The module 122, under control of the module 126, may buffer the reconstructed picture as a new non-post-processed reference picture in the step 150. In the step 152, the module 124 may artifact process the reconstructed picture using one or more techniques (e.g., full deblock or partial deblock) to remove artifacts in the step 152. A post-processed picture may be presented in the signal PRO from the module 124 to the module 122 in the step 154 for storage as a new post-processed reference picture.

For the pictures that should use a post-processed reference picture (e.g., the YES branch of step 144), a corresponding post-processed reference picture (previously decoded) may be read from the module 122 to the module 120 via the signal REF2 in the step 156. The module 120 may then motion-compensated decode the current compressed picture using the post-processed reference picture in the step 158.

In the step 160, the module 124 may perform a full deblock filtering on the reconstructed pictures received from both the step 148 and the step 158 to reduce blocking artifacts. The post-processed pictures may be presented as clean intermediate pictures to each of the modules 128 and/or 130 in the signal INT. The module 128 may convert the intermediate pictures into a format suitable for driving a display monitor in the step 162. The resulting drive signals may be presented in the signal OUT. The module 130 may encode the intermediate pictures into another bitstream (e.g., an H.264 bitstream) in the step 164. The resulting transcoded pictures may be presented in the signal BIT2. The above steps may be repeated for each compressed picture received in the signal BIT1.

Figure 3:
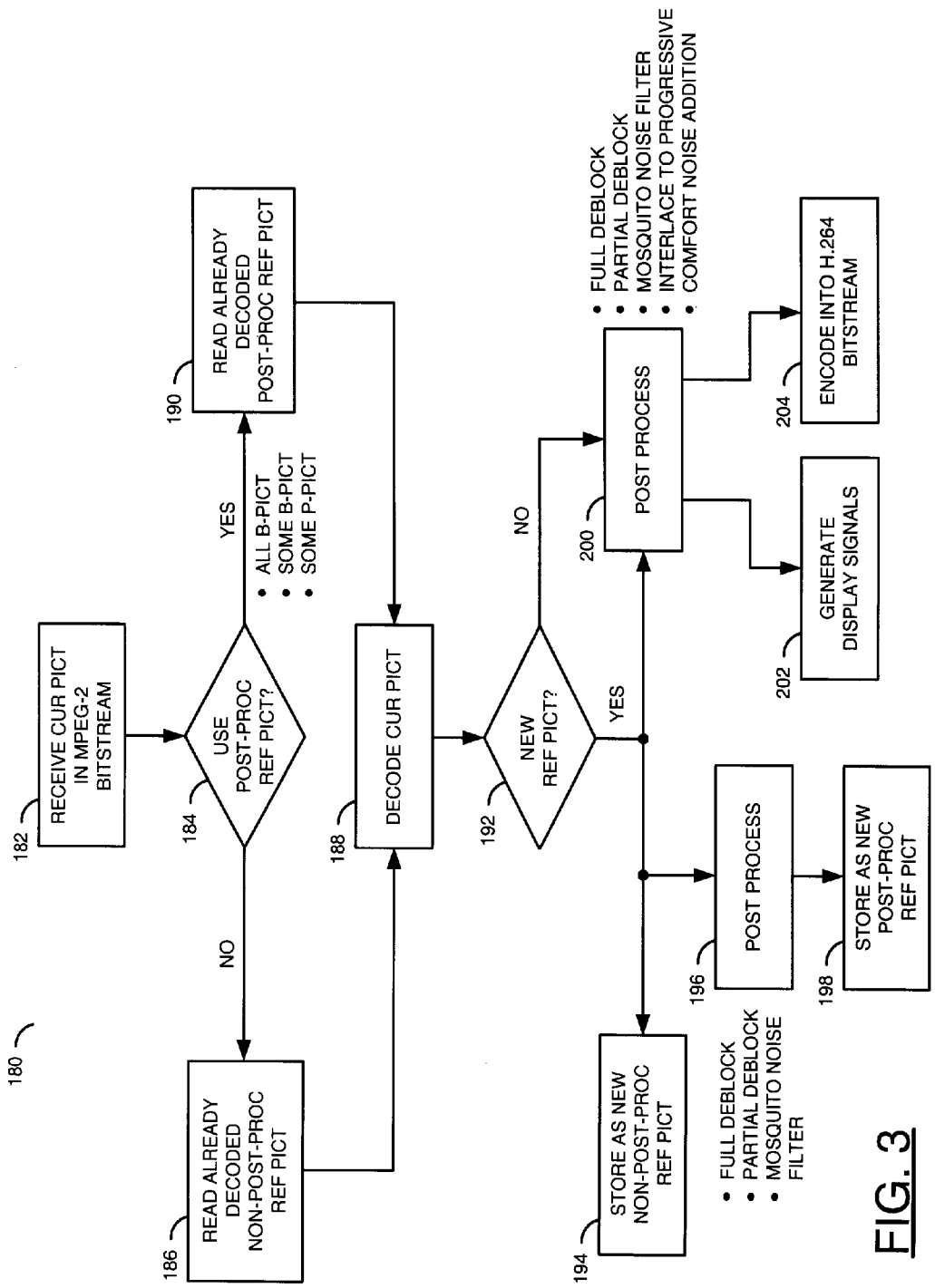
FIG. 3 is a flow diagram of another example implementation of a method for compressed picture reconstruction.

Referring to FIG. 3, a flow diagram of another example implementation of a method 180 for compressed picture reconstruction is shown. The method (or process) 180 may be implemented by the circuit 104. The method 180 generally comprises a step (or block) 182, a step (or block) 184, a step (or block) 186, a step (or block) 188, a step (or block) 190, a step (or block) 192, a step (or block) 194, a step (or block) 196, a step (or block) 198, a step (or block) 200, a step (or block) 202 and a step (or block) 204.

In the step 182, the module 120 may receive a sequence of compressed pictures via the signal BIT1. The module 126 may determine if each of the compressed pictures should be decompressed with a post-processed reference picture or not in the step 184. Generally, some to all of the B-pictures should use a post-processed reference picture and some of the P-pictures may use a post-processed reference picture. For the pictures not using a post-processed reference picture (e.g., the NO branch of step 184), a corresponding non-post-processed reference picture (already decoded) may be transferred from the module 122 to the module 120 in the step 186. The compressed pictures may then be motion-compensated decoded in the step 188.

For compressed pictures that may use a post-processed reference picture (e.g., the YES branch of step 184), a corresponding post-processed reference picture (already decoded) may be read from the module 122 to the module 120 in the step 190. The compressed pictures may then be motion-compensated decoded in the step 188.

In the step 192, the module 126 may determine which among the reconstructed reference pictures are to be saved for later use as reference pictures. The new reference pictures may include select reconstructed reference pictures that have been motion compensated with other post-processed reference pictures. The select reconstructed pictures may permit an acceptably limited amount of drift to be introduced into some reference pictures.

For reconstructed pictures that are suitable as new reference pictures (e.g., the YES branch of step 192), the module 126 may command the module 122 to buffer such pictures as non-post-processed reference pictures in the step 194. The module 124 may post-process (artifact process) the reconstructed pictures in the step using one or more techniques to create new post-processed reference pictures in the step 196. The post-processing techniques may include, but are not limited to, full deblock filtering, partial deblock filtering, mosquito noise reduction and/or similar artifact reducing techniques. The new post-processed reference pictures may be buffered in the module 122 in the step 198.

In the step 200, the module 154 may post-process the reconstructed pictures using one or more techniques to improve the visual appearance of the pictures. The post-processing techniques may include, but are not limited to, full deblock filtering, partial deblock filtering, mosquito noise reduction, deinterlacing, comfort noise addition and other similar image quality enhancement techniques. The post-processing performed in the step 200 may be the same or different from the post-processing performed in the step 196. The module 128 may generate the display signal OUT from the post-processed intermediate pictures in the step 202. The module 130 may generate the signal BIT2 from the post-processed intermediate pictures in the step 204.

For reconstructed pictures that are not suitable as new reference pictures (e.g., the NO branch of step 192), the pictures may be post-processed in the step 200 by the module 124. Thereafter, the post-processed intermediate pictures may be used by the module 128 in the step 202 to create the signal OUT and/or by the module 130 in the step 204 to create the signal BIT2.

Rather than just switching between using either (i) post-processed/deblocked for non-reference type decoding and (ii) non-post-processed/non-deblocked reference pictures for reference type decoding, the circuit 104 may switch between a continuum of the two types of reference pictures. In general, a less blocky (or more post-processed) version of a reference picture may be used for reconstructing a compressed picture rather than another more blocky version of the reference picture. As such, instead of motion compensating all non-reference pictures with deblocked references pictures, only a certain number may do so and/or may use partially deblocked reference pictures.

Figure 4:
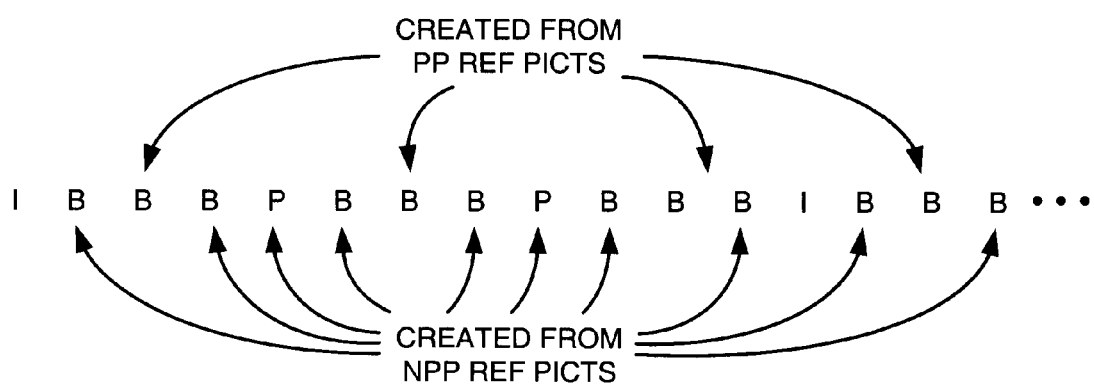
FIG. 4 is a diagram of a first example sequence of pictures.

Referring to FIG. 4, a diagram of a first example sequence of pictures is shown. The sequence may be represented in a display order for ease of understanding. A period of the sequence generally comprises the picture types IBBBPBBBPBBB. When motion compensating in the module 120, some of the B-pictures may use non-post-processed (NPP) reference pictures while other B-pictures use post-processed (PP) reference pictures. For example, the B-pictures that are a single temporal picture distance away from an I-picture or a P-picture may be decoded using the non-post-processed reference pictures. The B-pictures that are multiple temporal picture distances away from an I-picture or a P-picture may be decoded using the post-processed reference pictures. Other picture-type sequences and other decisions for using NPP/PP reference pictures may be implemented to meet the criteria of a particular application.

Rather than decoding all reference-type compressed pictures using only non-post processed (e.g., deblocked) pictures for reconstruction, only a certain number may do so. For example, selection of which reference-type compressed pictures are decoded using non-post-processed references and which are decoded using post-processed reference may be configured to help reduce drift when/where necessary.

Figure 5:
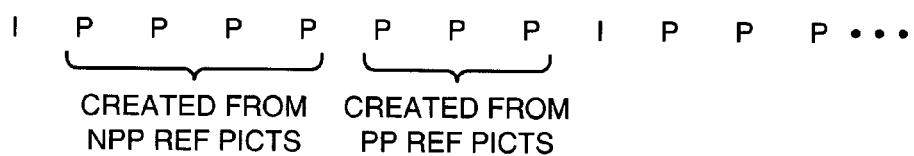
FIG. 5 is a diagram of a second example sequence of pictures.

Referring to FIG. 5, a diagram of a second example sequence of pictures is shown. The sequence may be represented in a display order for ease of understanding. A period of the sequence generally comprises the picture types IPPP-PPPP. In the example, the first four P-pictures following an initial I-picture may be motion compensated with non-post-processed (NPP) reference pictures to avoid drift. The last three P-pictures in the period may be motion compensated using post-processed (PP) reference pictures. As such, a limited amount of drift may be introduced into the last three P-pictures. However, the drift may be ended by the subsequent I-picture. If the drift is reasonably small, the visual quality improvement introduced by using the post-processed reference pictures may outweigh any distortion introduced by the drift, yielding an overall picture quality improvement.

An MPEG-2 bitstream decoded using the present invention may look roughly twice as good as existing techniques for decoding MPEG-2. Some of the existing techniques for deblocking MPEG-2 video do not remove blockiness that is interior to the block grid. In contrast, the present invention filters the blockiness in the interior of the block grid for non-reference type pictures (e.g., the blockiest B-pictures). A result is that either the existing techniques only removes half the blockiness compared with the present invention, or the existing techniques remove much more detail than the present invention.

Some existing techniques for deblocking can also reduce blockiness interior to pictures. However, in doing so an unacceptable amount of detail is removed from the pictures as such techniques remove all edges throughout the picture. In contrast, the present invention may be more selective by targeting for removal only the blocky edges on known block grid locations thereby keeping/retaining much more detail in the decoded video.

The function performed by the diagrams of FIGS. 1-5 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the scope of the invention.

The invention claimed is:

1. A method of compressed picture reconstruction using a plurality of post-processed reference pictures, comprising the steps of:
   (A) generating in a decoder a first of a plurality of reconstructed pictures by decoding a first of a plurality of compressed pictures using motion compensation relative to at least one of a plurality of first reference pictures buffered in a memory, wherein (i) said compressed pictures are received in an input bitstream and (ii) said first reference pictures are not post-processed after being reconstructed;
   (B) generating in a processor a first of a plurality of processed pictures by artifact processing said first reconstructed picture to remove artifacts present in said first reconstructed picture;
   (C) buffering in said memory both (i) said first reconstructed picture as one of said first reference pictures and (ii) said first processed picture as one of a plurality of second reference pictures, wherein said second reference pictures are post-processed after being reconstructed; and
   (D) generating a second of said reconstructed pictures by decoding a second of said compressed pictures using motion compensation relative to at least one of said second reference pictures buffered in said memory.

2. The method according to claim 1, wherein said first compressed picture is encoded into said input bitstream using a third reference picture that has not been deblocked.

3. The method according to claim 1, wherein said artifact processing comprises a deblock filtering.

4. The method according to claim 1, further comprising the steps of:
generating a first of a plurality of intermediate pictures by post-processing said first reconstructed picture; and
generating a second of said intermediate pictures by post-processing of said second reconstructed picture.

5. The method according to claim 4, wherein said post-processing differs from said artifact processing.

6. The method according to claim 4, further comprising the step of:
encoding both said first intermediate picture and said second intermediate picture into an output bitstream.

7. The method according to claim 6, wherein said input bitstream comprises an MPEG-2 compliant bitstream and said output bitstream comprises an H.264 compliant bitstream.

8. The method according to claim 4, further comprising the steps of:
generating a second of said processed pictures by said artifact processing of said second reconstructed picture; and
buffering said second processed picture in said memory as one of said second reference pictures.

9. The method according to claim 1, wherein (i) a first set of said compressed pictures that are suitable to use as said first reference pictures are decoded using said first reference pictures and (ii) a second set of said compressed pictures that are not suitable to use as said first reference pictures are decoded using said second reference pictures.

10. The method according to claim 1, further comprising the step of:
decoding a subset of a plurality of P-pictures among said compressed pictures using said second reference pictures.

11. A circuit comprising:
a decoder configured to (i) generate a first of a plurality of reconstructed pictures by decoding a first of a plurality of compressed pictures using motion compensation relative to at least one of a plurality of first reference pictures buffered in a memory, wherein (a) said compressed pictures are received in an input bitstream and (b) said first reference pictures are not post-processed after being reconstructed, (ii) generate a second of said reconstructed pictures by decoding a second of said compressed pictures using motion compensation relative to at least one of a plurality of second reference pictures buffered in said memory, wherein said second reference pictures are post-processed after being reconstructed and (iii) buffer said first reconstructed picture in said memory as one of said first reference pictures; and
a processor configured to (i) generate a first of a plurality of processed pictures by artifact processing said first reconstructed picture to remove artifacts present in said first reconstructed picture and (ii) buffer said first processed picture in said memory as one of said second reference pictures.

12. The circuit according to claim 11, wherein said first compressed picture is encoded into said input bitstream using a third reference picture that has not been deblocked.

13. The circuit according to claim 11, wherein said artifact processing comprises a deblock filtering.

14. The circuit according to claim 11, wherein said artifact processing comprises a mosquito noise filtering.

15. The circuit according to claim 11, wherein said processor is further configured to generate a plurality of intermediate pictures by deinterlacing said reconstructed pictures.

16. The circuit according to claim 11, wherein said processor is further configured to generate a plurality of intermediate pictures by adding comfort noise to said reconstructed pictures.

17. The circuit according to claim 11, further comprising a display driver configured to generate a display signal conveying a plurality of intermediate pictures generated by said processor, said display signal being suitable to drive a display monitor.

18. The circuit according to claim 11, further comprising an encoder configured to generate an output bitstream from a plurality of intermediate pictures generated by said processor.

19. The circuit according to claim 11, further comprising a controller configured to control use of said second reference pictures in decoding said compressed pictures.

20. A circuit comprising:
means for (i) generating a first of a plurality of reconstructed pictures by decoding a first of a plurality of compressed pictures using motion compensation relative to at least one of a plurality of first reference pictures buffered in a memory, wherein (a) said compressed pictures are received in an input bitstream and (b) said first reference pictures are not post-processed after being reconstructed, (ii) generating a second of said reconstructed pictures by decoding a second of said compressed pictures using motion compensation relative to at least one of a plurality of second reference pictures buffered in said memory, wherein said second reference pictures are post-processed after being reconstructed, and (iii) buffering said first reconstructed picture in said memory as one of said first reference pictures; and
means for (i) generating a first of a plurality of processed pictures by artifact processing said first reconstructed picture to remove artifacts present in said first reconstructed picture and (ii) buffering said first processed picture in said memory as one of said second reference pictures.

* * * * *